July 29, 1958 A. C. LUTHER, JR 2,845,486

SHADING VOLTAGE GENERATORS

Filed Feb. 18, 1955 2 Sheets-Sheet 1

INVENTOR.
Arch C. Luther, Jr.
BY
[signature]
ATTORNEY

INVENTOR.
Arch C. Luther, Jr.
BY
[signature]
ATTORNEY 2,845,486

SHADING VOLTAGE GENERATORS

Arch Clinton Luther, Jr., Merchantville, N. J., assignor to Radio Corporation of America, a corporation of Delaware Application February 18, 1955, Serial No. 489,165

9 Claims. (Cl. 178—7.2)

The invention relates to television transmission systems and more particularly to voltage generators for compensating for image distortion produced by the varying sensitivity of photosensitive electrodes in television image pickup tubes.

In a television camera employing a storage type of image pickup tube, a signal is produced whenever light impinges on the photosensitive electrode in the tube. The television image signal is produced by scanning the photosensitive electrode to derive a current proportional to the charge stored on the photosensitive electrode in accordance with the light impinging thereon from the image to be reproduced. In present practice this scanning is carried out by deflecting an electron beam in two normally arranged (horizontal and vertical) directions. The image pickup tubes presently available commercially are subject to certain errors usually referred to as "shading" by the artisan. There are several principal types of shading. One type called "background" or "axis shading," occurs where no light impinges on the photosensitive electrode of the pickup tube. This type of shading is principally due to non-uniformities of tube structure and is most troublesome with the image orthicon tube wherein its is caused by non-uniformity of the surface of the first dynode in the electron multiplier portion. This type of shading is corrected by adding a corrective signal to the video signal output of the image pickup tube.

Another principal type of shading, termed "gain" or "modulation shading" is produced because of the structure of the photosensitive material deposited on the photosensitive electrode is often far from being a homogeneous layer throughout and therefore the sensitivity for the different portions of the electrode varies. This difference in sensitivity over the different parts of the area scanned results in an image signal which varies in magnitude whenever the electrode is exposed to light whose intensity remains the same over the various elements of the electrode. This type of shading is more serious in the vidicon and requires special circuitry for shading voltage insertion although the shading voltage generators described hereinafter may be used to produce the desired waveforms.

In general, the tolerances of image pickup tubes presently manufactured are such that the shading errors produced are not objectional in the case of monochrome or black-and-white television transmission systems, but in those systems where color images are to be reproduced the effect can be quite noticeable. This may be shown, for example, by televising a homogeneous yellow field. A yellow field is normally made up of equal quantities of red and green so that in the process of televising a yellow field, if the sensitivity of the red pickup tube is high on the right side, then the right side of the reproduced field will appear orange, thereby giving the false impression that the picture televised is actually orange on the right side.

In present systems, shading correction voltages usually have waveforms that are either sawtooth or parabolic or a combination of sawtooth and parabolic waveforms. These particular types of waveforms are almost universally electronically produced. For example, horizontal shading for a three-tube color camera requires the addition of sawtooth and parabola waveforms of either polarity to the video waveform in each of the three color channels. The known circuits for this purpose employ between five and six electron discharge systems in order to obtain sufficient isolation between controls for determining the amplitude, polarity, slope and other characteristics of the satisfactory sawtooth and parabolic shading voltage waves.

An object of the invention is to simplify the circuit arrangement required for generating shading voltages for a three-tube color camera.

Another object is to provide a simplified and improved shading voltage generating circuit arrangement of high stability.

A further object of the invention is to provide a horizontal shading voltage generating circuit of simplified construction and capable of being driven by the driving voltage delivered by conventional camera control equipment.

According to the invention shading correction voltages are generated by producing a pair of pulse trains in response to applied horizontal drive pulses which are are of substantially identical amplitude but of opposite polarity, deriving from an effective mixing of the two pulse trains, a third pulse train of desired polarity and amplitude, which may vary from zero to the maximum amplitude of the two pulse trains in either direction, and integrating the third pulse train to produce a sawtooth wave. By integrating the same two pulse trains of opposite polarity and from an effective mixing of the integrated pulse trains deriving a fourth pulse train of either of the two polarities and of amplitude varying from zero to the maximum of the two pulse trains as desired a serrated wave having parabolic curve portions is produced. The shading voltages desired is then obtained by combining the sawtooth wave and the wave having parabolic curve portions and correction is effected by injecting the shading voltage at low level into a conventional video signal amplifying circuit arrangement.

The more specific objects of the invention are attained in a single electron discharge tube circuit wherein drive pulses are applied to a paraphrase amplifier or repeater tube producing two pulse trains which are erect and inverted repetitions of the drive pulses. Variable tapped resistive elements are connected to the anode and cathode electrodes of the paraphrase amplifier tube so that by movement of the arm of the resistive element produces a pulse train of either polarity, depending upon the direction of movement, and of amplitude depending on the magnitude of the movement of the arm off center.

This pulse train is integrated in a circuit comprising a resistance element and a capacitance element connected between the arm of the resistive element and a point of fixed reference potential. A sawtooth wave is thus produced across the capacitance element. By means of integrating networks each comprising a resistive component and a capacitive component connected in series between the anode and cathode electrodes of the paraphase amplifier tube to a point of fixed reference potential, serrated waves having parabolic curve components are produced across the capacitive components. By means of another variably tapped resistive element a positive or a negative wave of this same waveform is derived and added to the sawtooth wave across the integrating capacitance element so that the composite wave forming the desired shading voltage is produced. Additional variably tapped resistive, resistance and capacitance elements are connected in parallel with the variably tapped resistive elements previously mentioned to obtain additional shading voltages for other channels. Most of the circuit is composed of passive networks, producing a high degree of stability in performance, so that the variably tapped resistance elements are satisfactorily isolated one from the other. Preferably, attenuating elements are employed to reduce the amplitude of the sawtooth waves to that of the parabolic waves.

In order that the invention may be more clearly understood and readily put to practice, a specific embodiment, given by way of example only, is described with reference to the accompanying drawing in which.

Figures 1, 3:
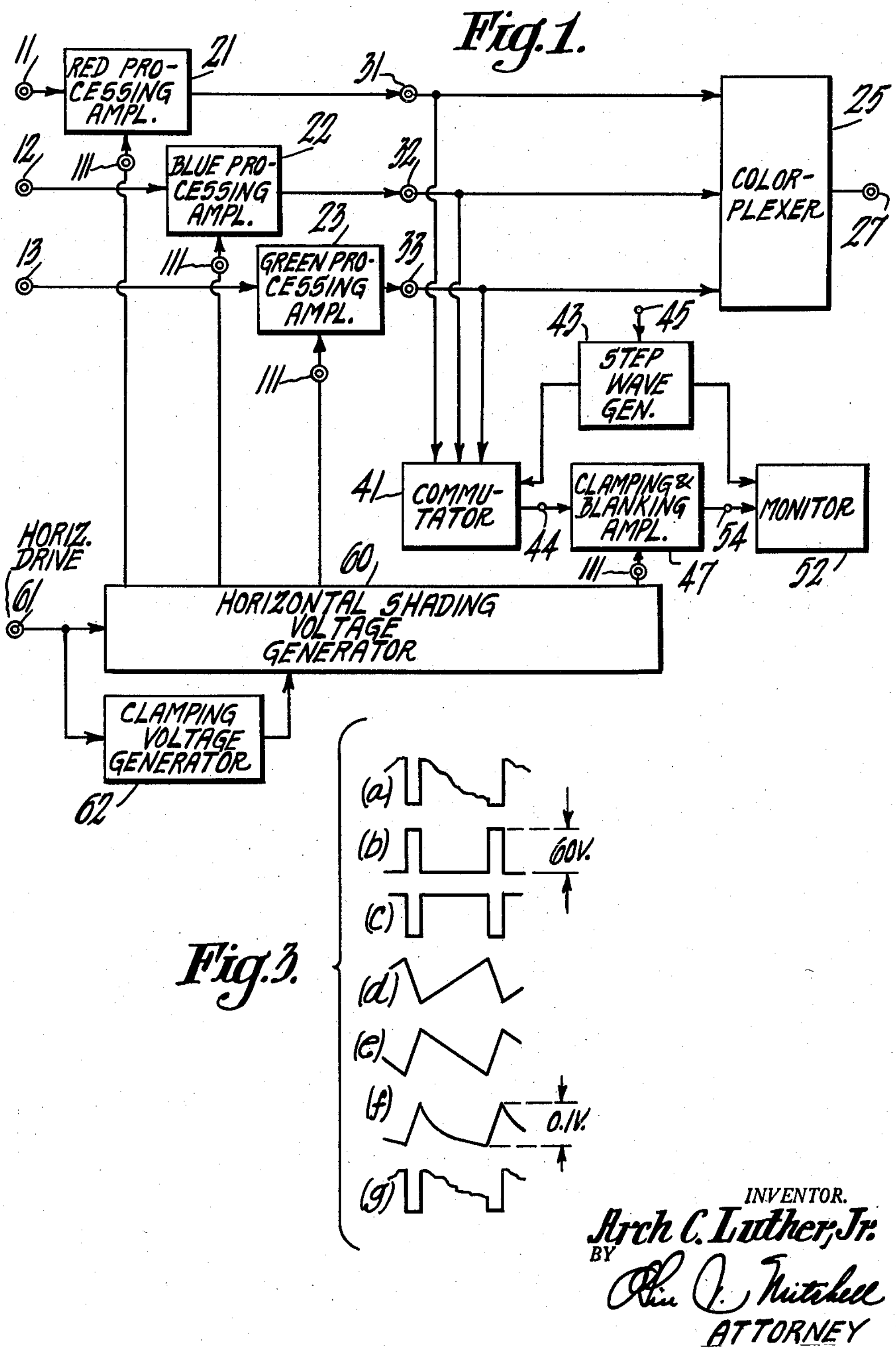
Fig. 1 is a functional diagram of portions of a color television broadcasting system incorporating a shading voltage generator according to the invention.
Fig. 3 is a graphical representation of waveforms appearing at various points in the circuit arrangement of Fig. 2.

A functional diagram of a complementary signal translating system in the form of a color television broadcasting system incorporating shading voltage generating circuitry according to the invention is shown in Fig. 1. The component color signals from color television cameras or other signal pickup devices, are presented at the input terminals 11, 12, 13 of a plurality of processing amplifiers 21, 22, 23, there being one such processing amplifier for each of the component color signals. These processing amplifiers are arranged so that the television broadcast station engineer is able to control the addition of blanking signals, vary the degree of pedestal setup adjust the gain of each component signal level, and according to the invention add shading potentials, and otherwise process the signals as required. After processing, the component signals appearing at the respective output terminals 31, 32 and 33 are applied to the input terminals of a colorplexer 25 or other signal combining circuitry. It should be understood that the operation of the colorplexer and of the processing amplifiers in no way form any part of the invention and that circuitry according to the invention is useful with many different types of amplifiers and/or colorplexers as required by type of color television signal transmission for which the television broadcasting system under consideration is established. The combined color signals from the colorplexer are available at the colorplexer output terminals 27 at which point the combined signals have been clamped blank, corrected for shading of the respective pickup tube, and otherwise put in the proper form for application to a visual signal broadcasting transmitter (not shown).

A monitoring system is usually provided in order that the broadcast station operating engineer can make the necessary operation or adjustments to the processing amplifiers with ease. This monitoring system may comprise an electronic commutator 41 coupled to the output terminals 31, 32 and 33 of the processing amplifiers and driven by a stepwave generator 43 in response to the application of a train of pulses at the input terminals 45 to serially apply samples of the color component signals to the input terminals 44 of a clamping and blanking amplifier 47 for subsequent application to a broadcast studio type monitor 52 connected to the output terminals 54 of the clamping and blanking amplifier 47. A stepwave from the stepwave generating circuit 43 is also applied to the monitor 52 so that the display comprises three sub-displays of the component color signals side-by-side for ready comparison by the engineer. The clamping and blanking amplifier 47 is usually identical to the signal processing amplifiers 21, 23 because it is less expensive to use a fourth amplifier of the same type than it is to design a special amplifier for the purpose although it should be understood that the type of amplifier used has substantially no effect on the circuit arrangement according to the invention. Horizontal shading voltages are obtained from a horizontal shading voltage generating circuit 60 according to the invention which operates in response to horizontal drive pulses applied to the input terminals 61 to provide shading voltages at the shading voltage input terminals 111 of the processing amplifiers 21, 22, 23. Shading voltage is not required in the clamping and blanking amplifier 47 since shading of the component color signals is already accomplished in the processing amplifiers. Advantageously however, clamping voltage obtained from a clamping voltage operating circuit 62 may be applied to the terminals 111 of the clamping and blanking amplifier 47.

Figure 2:
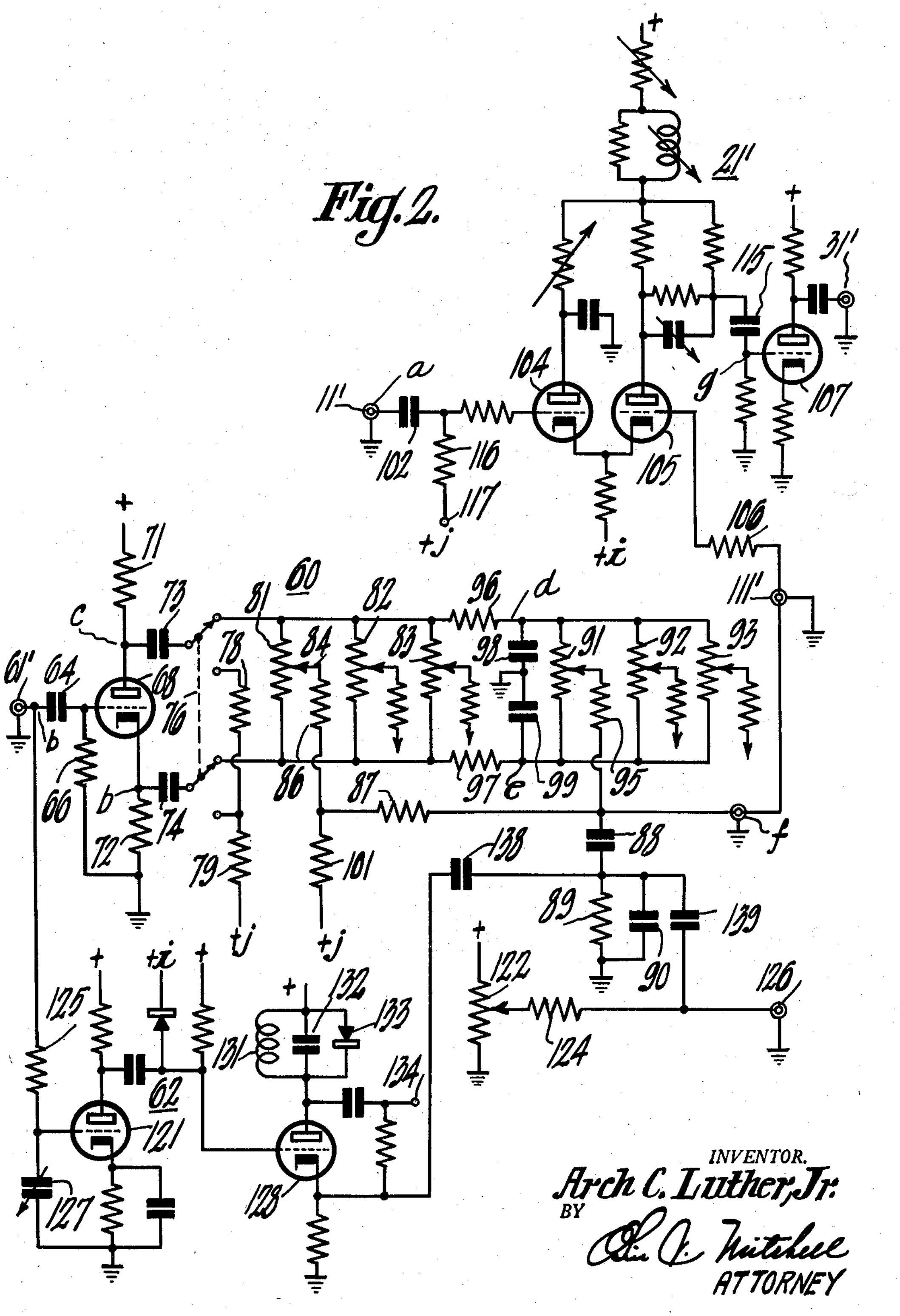
Fig. 2 is a schematic diagram of an example of horizontal shading voltage generator according to the invention as outlined in Fig. 1 together with an example of circuitry in which the shading voltage may be injected.

Referring to Fig. 2 there is shown a schematic diagram of a horizontal shading voltage generating circuit 60 a clamping voltage generating circuit 62 and the connections between the generating circuit 60 and a processing amplifier 21'. Drive pulses at horizontal line frequency rate are applied to input terminals 61'. By means of a coupling capacitor 64 the horizontal drive pulses are presented across a resistor 66 to the grid of a triode vacuum tube 68 or other form of controlled electron flow path device having two electrodes between which electrons are made to flow in response to the current in a control electrode. The electron discharge tube 68 is connected in the known paraphase repeater or amplifier circuit. Impedance elements in the form of resistors 71, 72 in the anode and cathode leads of the electron discharge tube 68 respectively are preferably of equal value. The input waveform is repeated across the resistors 71, 72 with the waveform across the former resistor 71 being inverted by action of the electron discharge tube 68. By means of coupling capacitors 73, 74 voltages which are of opposite polarity but of equal amplitude with respect to a point of fixed reference potential, shown here as ground, are obtained. A simple switch 76 is arranged so that the output terminals of the coupling capacitors 73, 74 can be connected across the series circuit comprising the resistors 71 and 72 and the direct energizing potential for the electron discharge tube 68 for the purpose of cutting off the shading voltages without varying the charge on the capacitors 73, 74. For generating shading voltages the output terminals of the coupling capacitors 73, 74 are connected by the switch 76 to the terminals of plurality of variably tapped resistive elements 81, 82 and 83 which are commonly termed potentiometers by the artisan. The pulses of opposite polarity applied to the terminals of the resistive element 81, being of substantially the same amplitude, result in substantially zero potential between the center of the resistive element 81 and the point of fixed reference potential, or ground. Alternatively, the centers of the resistive elements 81—83 may be connected directly to ground, but this is considered unnecessary. With the arm 84 of the resistive element 81 at the electrical center, zero shading voltage will be derived. As the arm is moved closer to the cathode connection a train of pulses of positive going potential and increasing amplitude will be obtained, and as the arm 84 is swung in the other direction a train of pulses of opposite polarity and increasing amplitude will be obtained. The derived pulses are applied through resistive elements in the form of resistors 86, and 87 to a capacitor 88, the capacity of which includes the capacity of the output coupling cable, where the pulses are integrated to form a voltage of sawtooth waveform. Voltages of parabolic waveform are obtained by means of additional resistive elements or potentiometers 91, 92 and 93 which are coupled to the anode and cathode electrodes of electron discharge tube 68 by means of resistive components in the form of resistors 96, 97. The resistive elements 91—93 are shunted by a pair of series connected capacitors 98, 99 the junction between which is connected to the point of fixed reference potential, or ground. The resistive component 96 and the capacitive component 98 form one integrating network while the components 97, 99 form a similar network for non-linearly integrating the sawtooth capacitor 88. The integrating capacitor 88 is connected to ground, either directly or, as shown by means of a resistor 89, of relatively low resistance, shunted by a capacitor 90, connected to the point of fixed reference potential, or ground. The purpose of the resistor 89 will be explained in detail hereinafter. Thus for all intents and purposes there appears across the integrating capacitor 88 a waveform comprising a combination of sawtooth and parabolic waveforms selected by movements of the arms 84 and 94 for application to the processing amplifiers.

Because of the loss in the integration networks, comprising the components 96—99, the maximum potentials of parabolic waveforms are less than those of the sawtooth waveform. This is equalized by the use of an attenuating resistor 101 of proper size to reduce the maximum amplitude of the sawtooth wave to approximately the same value as that of the parabolic wave.

Shading voltage outputs from each of the remaining pairs of resistive elements 82, 92; 83, 93 are passed through combining networks identical to that shown by resistors 86, 87 capacitor 88 and resistors 101 to the common resistor 89 and so on to an individual output cable for application to the respective processing or clamping and blanking amplifier. These networks have been omitted from the drawing in the interest of clarity.

The input color component signal of one processing amplifier 21′ is applied to terminals 11′ and through a coupling capacitor 102 and applied to the grid of the input tube 104. The anode of the tube 104 is coupled to the anode of a shading voltage injection tube 105. Variable resistance, variable inductance and variable capacitance elements are provided in the common anode circuit to compensate for the deleterious effects of transmitting the video signals over coaxial cables and like circuits. The horizontal shading signals for the amplifier are applied at the horizontal shading voltage input terminal 111′ through a grid resistor 106 to the grid of the shading voltage injection tube 105. The output video signal with shading correction at the anodes is applied by means of a coupling capacitor 150 to the remaining amplifying, blanking, vertical shading, gamma correcting, and other circuits of the processing amplifier which are exemplified here by a single amplifier tube 107 and available at the output terminals 31′ for immediate application to the colorplexer 25 or the equivalent combining circuit.

The individual horizontal shading voltage input terminals 111′ of each of the processing amplifiers 21, 22, 23 are connected to individual integrating capacitors 88. These capacitors are connected to a point of fixed reference potential through the common resistor 89 shunted by the common capacitor 90. In the case of the clamping and blanking amplifier 47 however, the input tube grid biasing resistor 116 is not returned to the intermediate voltage as indicated in the schematic of Fig. 2 but the terminal 117 is connected directly to the terminals 111′ and bias voltages obtained by means of a bleeder network comprising a variable tapped resistor 122 and series resistor 124. The terminal 126 is then connected by means of a coaxial cable to terminals 111′ and 117 of the clamping and blanking amplifier 47 only.

It is advantageous to apply a low value of clamping voltage to the low level stages of processing amplifiers and the shading voltage generating circuit of the invention lends itself to this purpose. Drive pulses from the input terminals 61′ are applied to an input amplifying tube 121 through a resistor 125 and a variable clamping pulse delay capacitor 127. The clamping pulse is developed in the succeeding state comprising a pulse generating tube 128 having a pulse forming network comprising an inductor 131, a capacitor 132 and a semi-conducting diode element 133 connected in the anode lead. Blanking voltage for all of the amplifiers 21, 22, and 23 and 47 to be applied at the normal blanking input terminals (not shown) is obtained at the terminals 134. Preferably a stage of amplification is desirable at this point. A low value of blanking potential is obtained across the cathode resistor 136 and is transferred to the common resistor 89 by means of a capacitor 138. This is the purpose of the common resistor 89. This common clamping voltage is applied to the grids of the input tubes 104 of the amplifier 21′ as used for the processing amplifiers 21—23 through the integrating capacitor 88, which also serves as a coupling capacitor, and to both of the input tubes 104 and 105 of the amplifier 21′ as used as the clamping and blanking amplifier 47 through a separate coupling capacitor 139. Otherwise the connections are the same for the clamping and blanking amplifier 47 as for the processing amplifiers 21—23.

Referring to Fig. 3 there are shown waveforms of voltages appearing at various portions of the circuit arrangement shown in Fig. 2. In Fig. 3(*a*) there is shown the input video signal at the terminals 11′ which input signal requires shading correction. At Fig. 3(*b*) there is shown the horizontal drive pulse which is applied to the terminal 61′ and which is repeated across the cathode load resistor 72. The inverted pulse which is obtained across the anode load resistor 71 is shown at Fig. 3(*c*). The sawtooth voltages appearing at the ungrounded terminals of the capacitors 98 and 99 as shown at Figs. 3(*d*) and (*e*). The resultant combination of sawtooth and parabolic voltages derived from the horizontal shading voltage generator 60 is shown at Fig. 3(*f*), while the corrected video signal obtained at the output of the initial stage of the processing amplifier is shown at Fig. 3(*g*). It should be noted that the waveform of the picture signal appearing between the blanking pulses is substantially the same but the amplitude variation has been corrected to overcome the deceptive signal amplitude caused by the non-uniformity of the photosensitive material on the image pickup tube storage electrode.

The values below were used for the listed components for an embodiment of the invention as shown in Fig. 2 which provided fully satisfactory operation in the color broadcasting station and are suggested as an aid in practice of the invention.

| Ref. No. | Component | Type or Value |
|---|---|---|
| 64 | Input coupling capacitor | 0.01 mf. |
| 66 | Grid bias resistor | 1 megohm. |
| 68 | Paraphase repeater tube | ½ 6BQ7A. |
| 71, 72 | Repeater load resistors | 100 k. |
| 73, 74 | Output coupling capacitors | 0.1 mf. |
| 78 | Charging resistor | 22 kilohms. |
| 79 | Charging resistor | 150 kilohms. |
| 81–83 | Sawtooth potentiometers | 100 kilohms. |
| 86 | Series resistor | 470 kilohms. |
| 87 | Series resistor | 220 kilohms. |
| 88 | Integrating capacitor | 820 mmf. plus cable capacity. |
| 89 | Common resistor | 10 ohms. |
| 90 | Bypass capacitor | 0.022 mf. |
| 91–93 | Parabolic potentiometers | 100 kilohms. |
| 96, 97 | Series resistors | 22 kilohms. |
| 98, 99 | Series capacitors | 4700 mmf. |
| 101 | Attenuating resistor | 47 kilohms. |
| 102 | Input capacitor | 0.1 mf. |
| 104–105 | Amplifier input tubes | 6BQ7A. |
| 106 | Grid resistor | 100 ohms. |
| 116 | Grid biasing resistor | 470 kilohms. |
| 122 | Bias potentiometer | 700 kilohms. |
| 124 | Series resistor | 220 kilohms. |
| 128 | Coupling capacitor | 0.22 mmf. |

The power supply delivered 280 volts between the points marked with the plus (+) sign and ground with 160 volts at interjacent points marked plus *j* (+*j*) and 130 volts at intermediate points marked plus *i* (+*i*). Other values will be found useful by those skilled in the art for other applications of the invention.

The invention claimed is:

1. A circuit arrangement for generating a shading voltage, including an electron discharge device having cathode, control and anode electrodes, means to apply pulse voltage between said control and said cathode electrodes, a resistor connected between said cathode electrode and a point of fixed reference potential and a resistor connected between said anode electrode and a point of fixed potential positive with respect to said point of fixed reference potential, a pair of capacitors having terminals individually connected to said cathode and said anode electrodes and having other terminals, a resistive element connected between the other terminals of said capacitors, a pair of series resistive components having terminals individually connected to said other terminals of said capacitors and to the terminals of said resistive element, a pair of capacitive components connected in series across the other terminals of said series resistive components and having the junction therebetween connected to said point of fixed reference potential, another resistive element connected across said other terminals of said series connected capacitive components and said series resistive components, an integrating capacitor having a terminal connected to said point of fixed reference potential, a resistor connected between an intermediate point on said other resistive element and the other terminal of said integrating capacitor, a pair of resistors connected in series between an intermediate point of the first said resistive element and said other terminal of said integrating capacitor, and a further resistor connected between the junction of said pair of series connected resistors and a point of fixed positive potential.

2. A circuit arrangement for generating a shading voltage in television transmitting apparatus, including an electron discharge device having cathode, control and anode electrodes, means to apply a pulse voltage wave between said control and said cathode electrodes, a resistor connected between said cathode electrode and a point of fixed reference potential across which said pulse voltage wave is repeated and another resistor connected between said anode electrode and a point of fixed potential positive with respect to said point of fixed reference potential across which other resistor is developed an inverted pulse voltage wave of the same form as that of said repeated pulse voltage wave, a pair of capacitors having terminals individually connected to said cathode and said anode electrodes and having other terminals, a potentiometer connected between the other terminals of said capacitors and having an arm, a pair of series resistors having terminals individually connected to the terminals of said potentiometer and said other terminals of said capacitors, a pair of capacitors connected in series across the other terminals of said series resistors and having the junction therebetween connected to said point of fixed reference potential, another potentiometer connected across said other terminals of said series resistors and said series connected capacitors and having an arm, an integrating capacitor having a terminal connected to said point of fixed reference potential through a low impedance path, a resistor connected between the arm of said other potentiometer and the other terminal of said integrating capacitor, a pair of resistors connected in series between the arm of the first said potentiometer and said other terminal of said integrating capacitor, and a further resistor connected between the junction of said pair of resistors and a point of fixed positive potential.

3. A circuit arrangement for generating shading voltages in television transmitting apparatus, including an electron discharge device having cathode, control and anode electrodes, means to apply a pulse voltage wave between said control and said cathode electrodes, a resistor connected between said cathode electrode and a point of fixed reference potential across which resistor said pulse voltage wave is repeated and another resistor connected between said anode electrode and a point of fixed potential positive with respect to said point of fixed reference potential across which other resistor is developed an inverted pulse voltage wave of the same form as that of said repeated pulse voltage wave, a pair of capacitors having terminals individually connected to said cathode and said anode electrodes and having other terminals, a plurality of potentiometers connected in parallel between the other terminals of said capacitors and having arms, a pair of series resistors having terminals individually connected to said other terminals of said capacitors and the terminals of said parallel connected potentiometers, a pair of capacitors connected in series across the other terminals of said series resistors and having the junction therebetween connected to said point of fixed reference potential, a plurality of additional potentiometers connected in parallel across said other terminals of said series resistors and said series connected capacitors, a plurality of integrating capacitors having terminals connected in common to said point of fixed reference potential through a low impedance path, a plurality of resistors each connected between the arm of one of said additional potentiometers and the other terminal of one of said integrating capacitors, a plurality of pairs of resistors each pair connected in series between the arm of one of the first said potentiometers and said other terminal of one of said integrating capacitors, and further resistors connected between the junction of each of said pairs of resistors and a point of fixed positive potential.

4. A circuit arrangement for generating and mixing a shading voltage in television transmitting apparatus, including an electron discharge device having cathode, control and anode electrodes, means to apply a pulse voltage wave between said control and said cathode electrodes, a resistor connected between said cathode-electrode and a point of fixed reference potential across which resistor said pulse voltage wave is repeated and another resistor connected between said anode electrode and a point of fixed potential positive with respect to said point of fixed reference potential across which other resistor is developed an inverted pulse voltage wave of the same form as that of said repeated pulse voltage wave, a pair of capacitors having terminals individually connected to said cathode and said anode electrodes and having other terminals, a potentiometer connected between the other terminals of said capacitors, a pair of series resistors having terminals individually connected to said other terminals of said capacitors and the terminals of said potentiometer, a pair of capacitors connected in series across the other terminals of said series resistors and having the junction therebetween connected to said point of fixed reference potential, another potentiometer connected across said other terminals of said series resistors and said series connected capacitors, an integrating capacitor having a terminal connected to said point of fixed reference potential through a low impedance path, a resistor connected between the arm of said other potentiometer and the other terminal of said integrating capacitor, a pair of resistors connected in series between the arm of the first said potentiometer and said other terminal of said integrating capacitor, and a further resistor connected between the junction of said pair of resistors and a point of fixed positive potential, a pair of electron discharge systems each having a cathode, a control grid and an anode, a common cathode impedance connected between said cathodes and another point of fixed positive energizing potential, means to apply a video frequency signal voltage wave between the control grid of one of said electron discharge systems and said point of fixed reference potential, a resistor connected between the other terminal of said integrating capacitor and the control grid of the other of said electron discharge systems, and an impedance network intercoupling the anodes of said electron discharge systems and connecting said anodes to a point of fixed positive reference potential, and an amplifying network connected to said impedance network to derive therefrom said video frequency signal voltage wave corrected for shading.

5. A circuit arrangement for generating and mixing shading voltages in television transmitting apparatus, including an electron discharge device having cathode, control and anode electrodes, means to apply a pulse voltage wave between said control and said cathode electrodes, a resistor connected between said cathode electrode and a point of fixed reference potential across which resistor said pulse voltage wave is repeated and another resistor connected between said anode electrode and a point of fixed potential positive with respect to said point of fixed reference potential across which other resistor is developed an inverted pulse voltage wave of the same form as that of said repeated pulse voltage wave, a pair of capacitors having terminals individually connected to said cathode and said anode electrodes and having other terminals, a plurality of potentiometers connected in parallel between the other terminals of said capacitors and having arms, a pair of series resistors having terminals individually connected to said other terminals of said capacitors and the terminals of said parallel connected potentiometers, a pair of capacitors connected in series across the other terminals of said series resistors and having the junction therebetween connected to said point of fixed reference potential, a plurality of additional potentiometers connected in parallel across said other terminals of said series resistors and said series connected capacitors and having arms, a plurality of integrating capacitors having terminals connected in common to said point of fixed reference potential through a low impedance path, a plurality of resistors each connected between the arm of one of said additional potentiometers and the other terminal of one of said integrating capacitors, a plurality of pairs of resistors each pair connected in series between the arm of one of the first said potentiometers and said other terminal of one of said integrating capacitors, and further resistors connected between the junction of each of said pairs of electron resistors and a point of fixed positive potential, a plurality of pairs of discharge systems each having a cathode, a control and an anode, a common cathode impedance connected between said cathodes and another point of fixed positive energizing potential, means to apply video frequency signal voltage waves individually between the control grid of one of said electron discharge systems of each pair and said point of fixed reference potential, a plurality of resistors individually connected between the other terminal of one of said integrating capacitors and one of said electron discharge systems of each pair, and a plurality of impedance networks individually intercoupling the anodes of each of said pairs of electron discharge systems and connecting said anodes to a point of fixed positive reference potential, and a plurality of amplifying networks individually connected to said impedance networks to derive therefrom said video frequency signal voltage waves corrected for shading.

6. A circuit arrangement for generating and mixing shading voltages in television transmitting apparatus, including an electron discharge device having cathode, control and anode electrodes, means to apply a pulse voltage wave between said control and said cathode electrodes, a resistor connected between said cathode electrode and a point of fixed reference potential across which resistor said pulse voltage wave is repeated and another resistor connected between said anode electrode and a point of fixed potential positive with respect to said point of fixed reference potential across which other resistor is developed an inverted pulse voltage wave of the same form as that of said repeated pulse voltage wave, a pair of capacitors having terminals individually connected to said cathode and said anode electrodes and having other terminals, a plurality of potentiometers connected in parallel between the other terminals of said capacitors and having arms, a pair of series resistors having terminals individually connected to said other terminals of said capacitors and said parallel connected potentiometers, a pair of capacitors connected in series across the other terminal of said series resistors and having the junction therebetween connected to said point of fixed reference potential, a plurality of additional potentiometers connected in parallel across said other terminals of said series resistors and said series connected capacitors, a plurality of integrating capacitors having terminals connected in common to said point of fixed reference potential through a low impedance resistor, a plurality of resistors each connected between the arm of one of said additional potentiometers and the other terminal of one of said integrating capacitors, a plurality of pairs of resistors each pair connected in series between the arm of one of the first said potentiometers and said other terminal of one of said integrating capacitors, and further resistors connected between the junction of each of said pairs of resistors and a point of fixed positive potential, a plurality of pairs of electron discharge systems each having a cathode, a control grid and an anode, a common cathode impedance connected between said cathodes and another point of fixed positive energizing potential, means to apply video frequency signal voltage waves individually between the control grid of one of said electron discharge systems of each pair and said point of fixed reference potential, a plurality of resistors individually connected between the other terminal of one of said integrating capacitors and the control grid of the other of said electron discharge systems of each pair, and a plurality of impedance networks individually intercoupling the anodes of each pair of said electron discharge systems and connecting said anodes to a point of fixed positive reference potential, a plurality of amplifying networks individually connected to said impedance networks to derive therefrom said video frequency signal voltage waves corrected for shading, a clamping voltage generating circuit coupled to said control and cathode electrodes and responsive to said pulse voltage wave, and a capacitor connected between said clamping voltage generating circuit and the junction between said common low impedance resistor and said integrating capacitors.

7. A circuit arrangement for generating shading voltages in television transmitting apparatus, including means to generate a blanking wave, means to produce a pulse wave, means coupled to said pulse wave producing means to derive a pair of pulse waves in paraphase relationship, integrating means coupled to said deriving means to produce sawtooth waves, further integrating means coupled to said deriving means to produce parabolic waves, and means intercoupling said integrating means combining said sawtooth and parabolic waves, and means interposed in said coupling means and coupled to said generating means to add a blanking wave to said combined waves.

8. A circuit arrangement for generating shading voltages in television transmitting apparatus, including a paraphase repeating circuit comprising an electron discharge device having cathode, control and anode electrodes, means to apply pulse voltage wave between said control and cathode electrodes, a resistor connected between said cathode electrode and a point of neutral potential across which resistor said pulse voltage wave is repeated, another resistor connected between said anode electrode and a point of direct potential positive with respect to said point of neutral potential across which other resistor there appears an inverted pulse voltage wave, a pulse phase and amplitude determining circuit comprising a potentiometer having an arm and a resistance element, a pair of capacitors individually connecting terminals of said resistance element to the terminals of said resistors connected to the electrode of said electron discharge device, a parabolic wave integrating circuit comprising a resistor, a pair of capacitors and a resistor connected in series in the order named across the resistance element of said potentiometer with the junction between said pair of series connected capacitors connected to said point of neutral potential, a parabola phase and amplitude controlling potentiometer having a resistance element connected across said series connected capacitors and having an arm, an integrating capacitor having one terminal connected to said point of neutral potential through a low impedance path and having another terminal, a resistor connected between the other terminal of said integrating capacitor and the arm of said parabola phase and amplitude controlling potentiometer, a pair of resistors connected in series between the arm of said pulse phase and amplitude potentiometer and the other terminal of said integrating capacitor, and another resistor connected between the junction of the last said series connected resistors and a point of positive potential.

9. A circuit arrangement as defined in claim 8, and wherein said low impedance path is constituted by a resistance element and incorporating a blanking pulse generator having input terminals to which said pulse voltage wave is applied and output terminals connected cross said resistance element to add blanking pulses to the combined waveform appearing across said integrating capacitor.

No references cited.